(12) United States Patent
Da Costa Pito et al.

(10) Patent No.: US 8,985,679 B2
(45) Date of Patent: Mar. 24, 2015

(54) INSTRUMENT PANEL CROSSMEMBER FOR VEHICLES THAT HAVE DIFFERENT CONFIGURATIONS

(75) Inventors: Sergio Da Costa Pito, Cergy (FR); Christian Brancheriau, Herblay (FR); Laurent Baudart, Fresnoy en Thelle (FR); Albin Descamps, Montjavoult (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 14/127,888

(22) PCT Filed: Jun. 20, 2012

(86) PCT No.: PCT/EP2012/061895
§ 371 (c)(1),
(2), (4) Date: Dec. 19, 2013

(87) PCT Pub. No.: WO2012/175578
PCT Pub. Date: Dec. 27, 2012

(65) Prior Publication Data
US 2014/0125086 A1 May 8, 2014

(30) Foreign Application Priority Data
Jun. 21, 2011 (FR) ...................................... 11 55459

(51) Int. Cl.
*B62D 25/14* (2006.01)
(52) U.S. Cl.
CPC .................................... *B62D 25/145* (2013.01)
USPC ....................................... 296/193.02; 296/70
(58) Field of Classification Search
CPC ........................... B62D 25/145; B62D 25/147
USPC ................................. 296/193.02, 193.04, 70
See application file for complete search history.

(56) References Cited

U.S. PATENT DOCUMENTS

| 7,048,325 | B1 * | 5/2006 | Sandhu ..................... 296/193.02 |
| 8,256,830 | B2 * | 9/2012 | Hitz et al. ................ 296/193.02 |
| 2002/0100243 | A1 * | 8/2002 | Hein et al. .................... 52/655.1 |
| 2008/0054682 | A1 * | 3/2008 | Ellison et al. ............ 296/193.02 |
| 2010/0171339 | A1 * | 7/2010 | Zornack et al. .......... 296/193.02 |
| 2012/0049574 | A1 * | 3/2012 | Atsumi et al. ............ 296/193.02 |
| 2013/0057026 | A1 * | 3/2013 | Kim et al. ..................... 296/192 |
| 2013/0241235 | A1 * | 9/2013 | Baudart et al. ........... 296/193.02 |
| 2014/0049075 | A1 * | 2/2014 | Kasper et al. ................. 296/205 |
| 2014/0103685 | A1 * | 4/2014 | Mani ........................ 296/193.02 |

FOREIGN PATENT DOCUMENTS

| FR | 2 891 799 A1 | 4/2007 |
| WO | WO2008/087262 A1 | 7/2008 |
| WO | WO2009/077702 A1 | 6/2009 |

OTHER PUBLICATIONS

International Search Report for application No. PCT/EP2012/061895, dated Sep. 10, 2012, 2 pages (translated).

* cited by examiner

*Primary Examiner* — Jason S Morrow
(74) *Attorney, Agent, or Firm* — Reising Ethington P.C.

(57) ABSTRACT

An instrument panel crossmember for vehicles that have different configurations is intended to extend between two front pillars of a vehicle. The crossmember has a first portion extending opposite the vehicle driving seat. One end of the first portion connects to a front pillar of the vehicle, and another end of the first portion is connected to a fixing device. The fixing device is designed selectively to support a second portion of the crossmember that extends facing the vehicle passenger seat and/or to support a strut designed to connect the crossmember to the floor of the vehicle, depending on the configuration of the vehicle.

11 Claims, 2 Drawing Sheets

INSTRUMENT PANEL CROSSMEMBER FOR VEHICLES THAT HAVE DIFFERENT CONFIGURATIONS

TECHNICAL FIELD

The present invention relates to an instrument panel crossmember for vehicles that have different configurations, said crossmember being intended to extend between two front pillars of a vehicle.

The invention also relates to a line of vehicles.

BACKGROUND

Each vehicle in the line has a unique body shell structure, adapted to the body of the vehicle, the vehicle's propulsion mode and/or the equipment supported by said body shell.

FIG. 1 shows, from the inside of the vehicle, a vehicle body shell 2 of the prior art according to a first configuration.

In this first configuration, the body shell 2 comprises an instrument panel crossmember 4 extending transversely in the vehicle, and the ends of which are respectively fixed on the right and left front pillars of the body structure, by means of a support 6.

Traditionally, the crossmember 4 is formed by a hollow tubular element.

The crossmember 4 is designed to support different equipment of the vehicle, such as the instrument panel (not shown) of the vehicle. It may also serve to support a steering column support 8 of the vehicle.

To that end, the crossmember 4 comprises different support tabs (not shown) designed to support different pieces of equipment of the vehicle.

As shown in FIG. 1, the body shell 2 comprises an upper fire wall 10 separating the engine compartment of the vehicle and the passenger compartment 12 of that vehicle, and a lower recess crossmember 14 situated below the windshield of the vehicle, said upper fire wall 10 and said lower recess crossmember 14 being situated substantially at the instrument panel crossmember 4. A floor 16 delimits the bottom part of the passenger compartment 12.

A connecting tab 18, extending substantially in the longitudinal direction X of the vehicle, connects the lower recess crossmember 14 and the instrument panel crossmember 4.

The vehicle body shell made according to this first configuration also comprises a strut 20 connecting the main body of said crossmember 4 and the floor 16, to react part of the forces borne by the crossmember 4 and transmit them to the structure of the vehicle via the floor 16. The strut 20 is situated near the steering column support 8.

Other vehicle body shells exist that are made according to a second configuration. These vehicle body shells only comprise a half-crossmember of an instrument panel, i.e., only a single crossmember portion situated across from the driving seat and suitable for receiving the steering column support. In this second configuration, one of the ends of the portion is fixed to the left front pillar, and the other end supports the upper end of the strut. Thus, in this configuration, the forces borne by the crossmember are transmitted to the front left pillar and the floor.

Vehicle body shells also exist made according to a third configuration. These vehicle body shells do not comprise any strut, the forces borne by the crossmember extending transversely in the vehicle then being transmitted only to the structure of the vehicle via the right and left front pillars.

The different configurations described above may each be developed for a different type of vehicle, for example a sedan, a coupe, a coupe/cabriolet, etc., or for vehicles having different propulsion modes, such as an internal combustion engine, an electric engine or a hybrid propulsion mode.

Likewise, these different configurations may be used for vehicles having different equipment or for vehicles intended to be sold in different geographical regions. In fact, from one country to another, the safety standards vary, which sometimes requires redeveloping the body shell of the vehicle.

However, the development of each new vehicle body shell is expensive. A design study must be conducted on the body shell and, in particular, its instrument panel crossmember and any strut that may be present each time. Furthermore, each new development of parts requires expensive specific tools.

SUMMARY

One aim of the invention is to offset the aforementioned drawbacks by proposing an inexpensive line of vehicles, making it possible to reduce the development time for each vehicle in that line and the associated tooling costs.

To that end, the invention relates to an instrument panel crossmember of the aforementioned type, characterized in that
  the crossmember comprises a first portion extending opposite the vehicle driving seat, one end of said first portion being intended to connect to a front pillar of the vehicle, the other end being connected to a fixing device; and in that
  said fixing device is designed selectively to support one end of a second portion extending facing the vehicle passenger seat and/or a strut designed to connect the crossmember to the floor of the vehicle, depending on the configuration of the vehicle.

The crossmember according to the invention may include one or more of the following features:
  one of the ends of the second portion may be intended to be fixed to a front pillar of the vehicle;
  the fixing device may comprise a first platen extending substantially perpendicular to the transverse direction of the vehicle and fixed to the end of the first portion opposite the front pillar;
  the fixing device may comprise a second platen extending substantially perpendicular to the transverse direction of the vehicle and fixed to the end of the second portion positioned across from the first portion;
  the first platen may comprise fixing means and centering means intended to cooperate with receiving orifices of the second platen and/or the upper end of the strut;
  the fixing means may be formed by at least one threaded axle intended to cooperate with a nut;
  at least one of the first and second portions and the strut may be made from magnesium, or aluminum, or composite materials.

The invention also relates to a line of vehicles characterized in that each of the vehicles in the line includes an instrument panel crossmember according to the invention having the same first segment.

According to one embodiment, at least one vehicle in the line may include only a first portion and a second portion.

According to a second embodiment, at least one vehicle in the line may include only a first portion and a strut.

BRIEF DESCRIPTION OF THE DRAWINGS

The invention will be better understood upon reading the following description, provided solely as an example and done in reference to the appended drawings, in which.

DESCRIPTION OF THE ILLUSTRATED EMBODIMENT(S)

Figure 1:
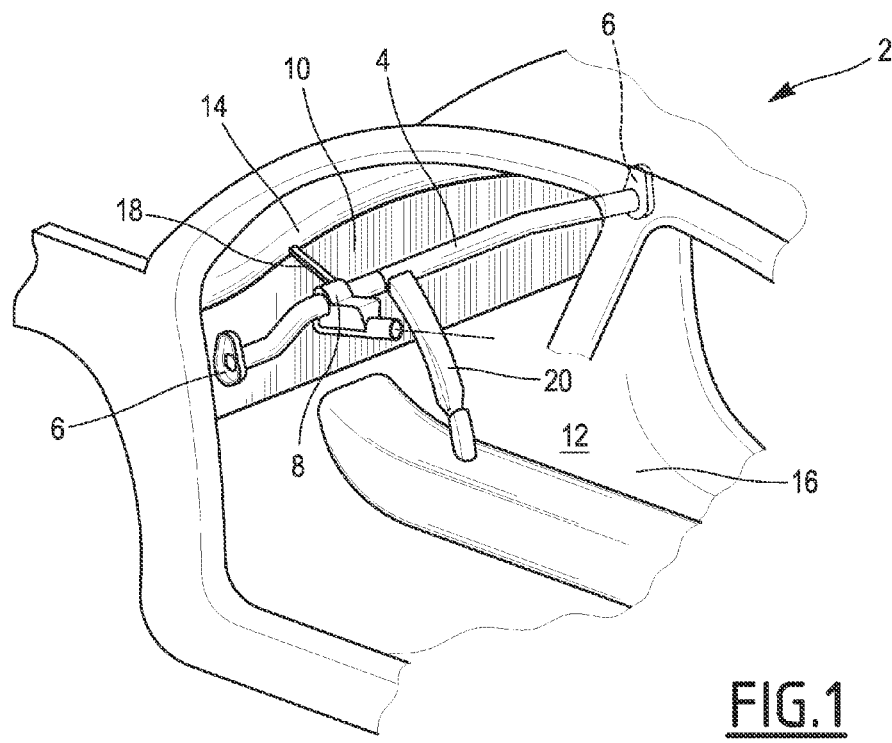
FIG. 1 shows a partial perspective view of a vehicle body shell of the prior art and comprising an instrument panel crossmember and a strut.

The references used in describing the prior art shown in FIG. 1 and designating the same parts will be used again in the description that follows.

In the rest of the description, the terms "front", "rear", "right", "left", "upper", "lower", "longitudinal", "transverse", and "vertical" are to be understood in reference to the usual system of orthogonal axes of the motor vehicles shown in the Figures and having:

a longitudinal axis X oriented from back to front,
a transverse axis Y oriented from right to left, and
a vertical axis Z oriented from bottom to top.

The invention aims to protect a line of vehicles having different body shell structure configurations, said structures having certain parts in common, as will be explained later.

The invention more particularly aims to protect a line of vehicles having three different body shell structure configurations, said structures including a first instrument panel crossmember portion 22 extending substantially across from the vehicle driving seat, and a second instrument panel crossmember portion 24 positioned across from the passenger seat of the vehicle and/or a strut 20.

Thus, in all configurations, the body shell structures comprise the first instrument panel crossmember portion 22 extending transversely and positioned across from the vehicle driving seat.

The first portion 22 includes an interface designed to receive the steering column support 8 and allow the fixing of one of the ends of the connecting tab 18, connecting the lower recess crossmember 14 and the instrument panel crossmember 4.

The second portion 24 may in particular be designed to support safety equipment containing an airbag designed to protect the vehicle's passenger in case of impact.

Furthermore, according to the invention, the first portion 22 and the second portion 24 and/or the strut 20 are fastened to each other using a fixing device 26.

We will now more particularly describe the first body shell structure configuration shown in FIGS. 2 to 5.

The first body shell structure configuration comprises the first instrument panel crossmember portion 22, one of the ends of which is fixed to the left front pillar 28 of the vehicle by means of a support 6, the second instrument panel crossmember portion 24, one of the ends of which is fixed to the right front pillar 30 of the vehicle by a support 6, and the strut 20.

Figure 2:
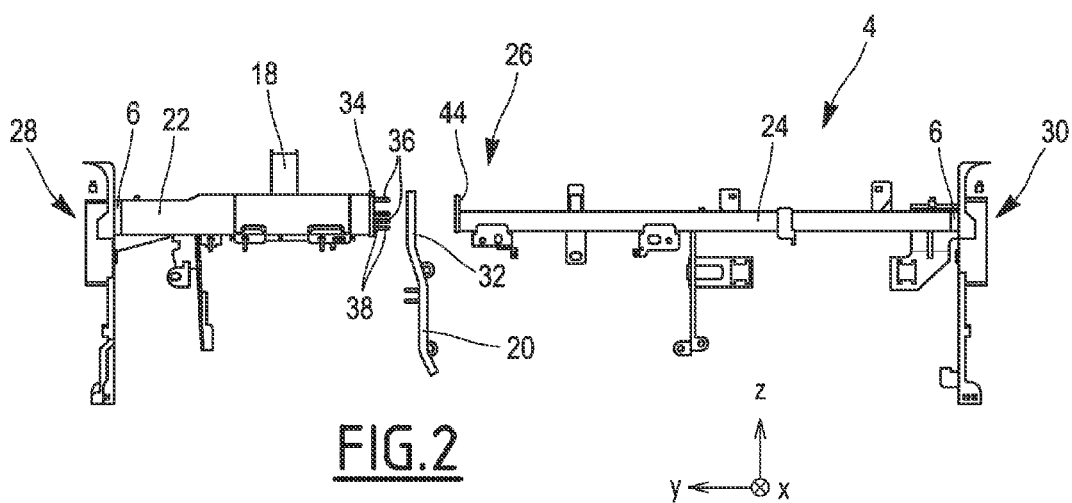
FIG. 2 is a partial front view of a first vehicle structure, said structure comprising an instrument panel crossmember made up of two half-portions and a strut assembled to each other using a fixing device.

The second portion 24 is positioned in the extension of the first portion 22, such that their axes are parallel. Preferably and as shown in FIG. 2, the first portion 22 and the second portion 24 extend coaxially.

As mentioned above, the first portion 22, the second portion 24 and the upper end 32 of the strut 20 are fixed to each other using the fixing device 26.

The fixing device 26 comprises fixing means 36, for example threaded axles that can be crimped or welded, of which there are three in the illustrated example, and positioned so as each to form the apices of a triangle. These fixing means 36 extend substantially transversely in the transverse direction Y protruding from the first portion 22.

Figures 3, 4, 5:
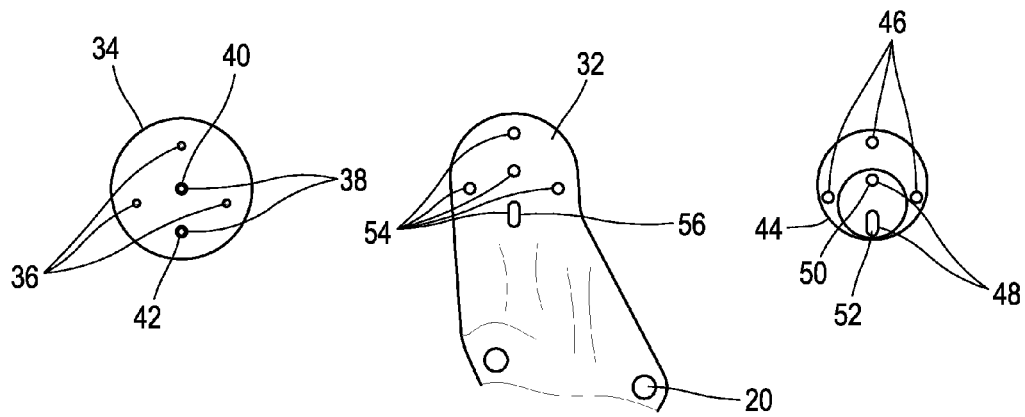
FIG. 3 shows a front view of a first platen belonging to the fixing device.
FIG. 4 shows a front view of the upper end of the strut.
FIG. 5 shows a front view of a second platen belonging to the fixing device.

The fixing device 26 comprises a first platen 34 shown in FIG. 3, with a substantially rounded shape, extending substantially perpendicular to the transverse direction Y of the vehicle and fixed to the end of the first portion 22 opposite the left front pillar 28. According to the embodiment shown in the figures, the fixing means 36 are formed on the first platen 34 and extend protruding therefrom in the transverse direction Y.

According to one embodiment, the fixing means 36 also include centering means 38, such as crimped or welded rods, of which there are two in the illustrated example, extending along axes extending substantially in the transverse direction Y protruding from the first portion 22. According to the embodiment shown in the figures, the centering means 38 are formed on the first platen, one 40 of said first rods being positioned at the center of the platen 34 and the other 42 near the perimeter of the lower part of the platen.

The axes of the centering means 38 are therefore substantially parallel to the axles forming the fixing means 36.

The fixing device also comprises receiving orifices 46, 54 for receiving the fixing means 36 and receiving orifices 48 for receiving the centering means 38, said orifices belonging to the second portion 24 and/or the upper end 32 of the strut. The receiving orifices 46, 54 for receiving the fixing means 36 and the receiving orifices 48 for receiving the centering means 38 extend along substantially transverse axes parallel to each other.

More particularly, the fixing device comprises a second platen 44 shown in FIG. 5, with a substantially rounded shape, extending substantially perpendicular to the transverse direction Y of the vehicle and fixed to the end of the second portion 24 opposite the right front pillar 30. The second platen 44 has a diameter smaller than that of the first platen 34.

Said second platen 44 bears the receiving orifices 46 of the fixing means 36, of which there are three in the illustrated example, and each forming the apices of a triangle.

The second platen 44 also includes the receiving orifices 48 of the centering means 38. In the example, two orifices are provided, one 50 with a round shape, intended to receive the central rod 40, and the other 52 with an oblong shape intended to receive the rod 42.

In the assembled position, the upper end 32 of the strut 20 extends between the first 34 and second 44 platens. As shown in FIG. 4, said end 32 bears the receiving orifices 54 for receiving the fixing means 36 and the centering means 38 intended to be positioned across from the orifices 46 and 48 of the second platen 44.

Thus, like the second platen 44, the upper end 32 of the strut 20 is also provided with an oblong orifice 56 intended to receive the rod 42.

In the illustrated example, in order to ensure fixing of the first and second platens 34 and 44 and the strut 20, nuts 58 are fixed on the threaded axles passing through the strut 20 and the second platen 44.

According to the arrangement of the receiving orifices 54 on the upper end 32 of the strut 20, the strut 20 may be positioned so as to extend substantially in the vertical direction Z of the vehicle or to be inclined relative to that vertical direction Z.

According to another embodiment, the fixing means 36 and the centering means 38 extend protruding from the second portion 24, and the receiving orifices for those fixing and centering means are provided on the first portion 22. To that end, it for example suffices to reverse the position of the first platen 34 and that of the second platen 44.

According to still another embodiment, the first portion 22 comprises one of the fixing means 36 and centering means 38 and the second portion 24 comprises the other of the fixing means 36 and centering means 38, the orifices for receiving these means being distributed suitably between the first and second portions.

The fixing means 36 and centering means 38 are therefore positioned in the extension of the first portion 22 and/or the second portion 34, and their axis substantially parallel to the axes of said first and second portions.

This arrangement makes it possible to facilitate the assembly of the second portion 24 and/or the strut 20 on the first portion 22 using the fixing device 26.

Furthermore, the fixing device 26 is not particularly cumbersome inasmuch as the fixing means 36 and the centering means 38 are fitted into the contour of the first portion 22 and/or the second portion 24, i.e., they do not increase the outer volume of the body shell structure.

Figure 6:
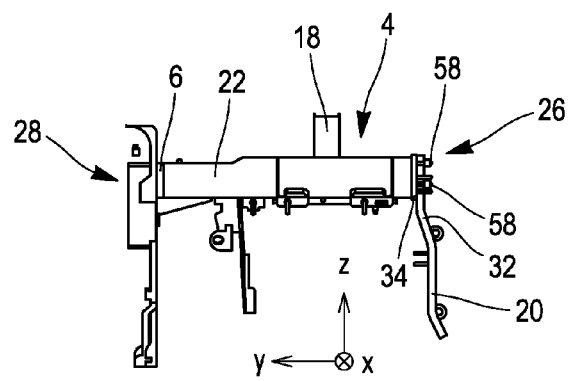
FIG. 6 shows a partial front view of a second vehicle structure.

We will now more particularly describe the second body shell structure configuration shown in FIG. 6.

This second body shell structure configuration comprises the first segment 22, one of the ends of which is fixed to the left front pillar 28 of the vehicle, and the strut 20, the end of the first portion 22 opposite the left front pillar 28 supporting the upper end 32 of the strut 20. Thus, the second body shell structure configuration has no second portion 24 extending across from the vehicle passenger seat.

The strut 20 is fixed on the first portion 22 using the fixing device 26.

To that end, the first portion 22 comprises the first platen 34 previously described, and the upper end 32 of the strut 20 comprises the receiving orifices 54 for receiving the fixing means 36 and the centering means 38, previously described. The fixing of the first platen 34 and the upper end 32 of the strut 20 is done by nuts 58 fixed on the threaded axles passing through said upper end 32.

Figure 7:
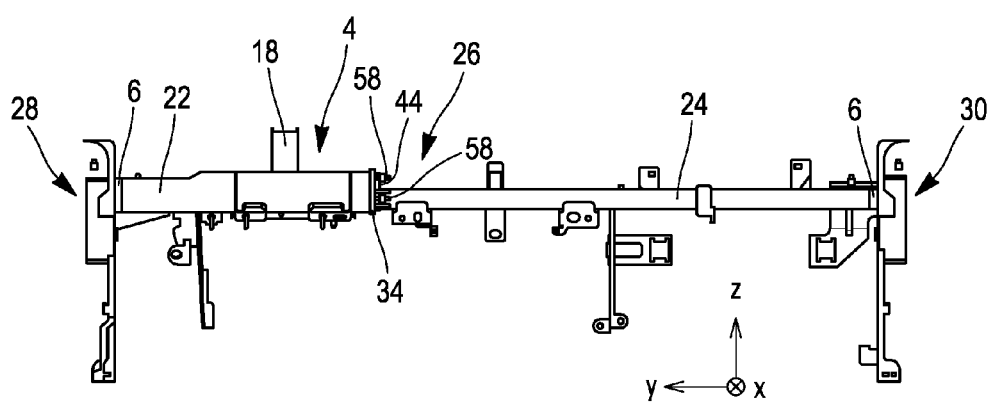
FIG. 7 shows a partial front view of a third vehicle structure.

We will now more particularly describe the third body shell structure configuration shown in FIG. 7.

This third body shell structure configuration comprises the first portion 22, one of the ends of which is fixed to the left front pillar 28 of the vehicle, and the second portion 24, one of the ends of which is fixed to the right front pillar 30 of the vehicle. Thus, this third body shell structure configuration has no strut.

The first portion 22 is fixed on the second portion 24 using the fixing device 26.

To that end, the fixing device 26 comprises the first and second platens 34 and 44 previously described, respectively fixed to the ends of the first and second portions 22 and 24. The first and second platens are fixed to each other by nuts 58 fixed on the threaded axles passing through the second platen 44.

Thus, the second portion 24 is shared by the first and third body shell structure configurations, and the strut 20 is shared by the first and second body shell structure configurations. The second portion 24 and the strut 20 are thus positioned selectively on the fixing device 26 depending on the body shell structure configuration to which they belong.

The first portion is shared by the first, second and third body shell structure configurations.

Preferably, the first and second portions 22 and 24 are obtained from a hollow tubular element.

Preferably, the strut 20 is obtained from a folded metal sheet.

Preferably, the first and second portions 22 and 24 and the strut 20 are made from magnesium, aluminum, steel, composite materials, or a hybrid solution, for example steel/magnesium or steel/composite materials.

Such a line of vehicles makes it possible to reduce the cost of developing vehicles and that line significantly by avoiding complete development of the instrument panel crossmember for each new vehicle configuration. The tooling costs are also reduced.

Furthermore, the vehicle body shells of that line have an optimized mass.

Advantageously, a same body shell configuration may be chosen for different vehicles, only the materials and the thickness of the elements of the crossmember being adapted to the second portion and/or the strut.

The vehicles described above are more particularly designed for driving on the right. Of course, the invention also aims to protect vehicles designed for driving on the left.

The invention claimed is:

1. An instrument panel crossmember for vehicles that have different configurations, said crossmember being intended to extend between two front pillars of a vehicle, the crossmember comprises a first portion extending opposite the vehicle driving seat, one end of said first portion being intended to connect to a front pillar of the vehicle, another end being connected to a fixing device, said fixing device being designed to support one end of a second portion having an arrangement of receiving orifices and extending facing the vehicle passenger seat and/or an end of a strut having an arrangement of receiving orifices and being designed to connect the crossmember to the floor of the vehicle, characterized in that the fixing device comprises fixing and/or centering elements designed to cooperate with both arrangements of receiving orifices, each of the second portion of the crossmember and the strut being selectively included in the vehicle depending on the configuration of the vehicle.

2. The crossmember according to claim 1, characterized in that the second portion is designed to be fixed to one of the front pillars of the vehicle.

3. The crossmember according to claim 1, characterized in that the fixing device comprises a first platen extending substantially perpendicular to the transverse direction of the vehicle and fixed to the other end of the first portion opposite the front pillar.

4. The crossmember according to claim 3, comprising a second platen extending substantially perpendicular to the transverse direction of the vehicle and fixed to the end of the second portion positioned across from the first portion.

5. The crossmember according to claim 4, characterized in that the first platen comprises the fixing and/or centering elements, the second platen comprising the receiving orifices for said elements.

6. The crossmember according to claim 5, characterized in that the fixing elements are formed by at least one threaded axle intended to cooperate with a nut.

7. The crossmember according to claim 6, characterized in that the axle of the fixing elements is substantially parallel to an axis of the first portion and/or the second portion.

8. The crossmember according to claim 1 characterized in that at least one of the first portion, the second portion, or the strut is made from magnesium, or aluminum, or composite materials.

9. A line of vehicles, characterized in that each of the vehicles in the line includes an instrument panel crossmember according to claim 1 having the same first portion.

10. The line of vehicles according to claim 9, wherein at least one vehicle in the line includes the first portion and the second portion, but no strut.

11. The line of vehicles according to claim 9, wherein at least one vehicle in the line includes the first portion and the strut, but no second portion.

* * * * *